(12) United States Patent
Morse (10) Patent No.: US 6,394,524 B1
(45) Date of Patent: May 28, 2002

(54) PIVOTABLE RACK APPARATUS FOR A PICKUP TRUCK

(76) Inventor: Charles A. Morse, 25 Crescent Ave., Beverly, MA (US) 01915

( * ) Notice: Subject to any disclaimer, the term of this patent is extended or adjusted under 35 U.S.C. 154(b) by 0 days.

(21) Appl. No.: 09/848,129

(22) Filed: May 3, 2001

Related U.S. Application Data (63) Continuation-in-part of application No. 09/695,482, filed on Oct. 24, 2000.

(51) Int. Cl.$^7$ .............................. B62L 1/06; B62D 33/08; B60R 21/02
(52) U.S. Cl. ................................ 296/26.02; 296/26.06; 296/26.11
(58) Field of Search ........................... 296/26.02, 26.08, 296/26.03, 26.11, 56, 57.1, 37.6, 43, 26.06; 280/748

(56) References Cited

U.S. PATENT DOCUMENTS

| | | | |
|---|---|---|---|
| 4,310,194 A | * | 1/1982 | Biller .......................... 296/159 |
| 5,147,103 A | * | 9/1992 | Ducote ....................... 296/37.6 |
| 5,700,047 A | * | 12/1997 | Leitner et al. ................ 296/26 |
| 6,113,173 A | * | 9/2000 | Leitner et al. ........... 296/26.11 |

* cited by examiner

Primary Examiner—Dennis H. Pedder
Assistant Examiner—Greg Blankenship
(74) Attorney, Agent, or Firm—Don Halgren (57) ABSTRACT

A rack apparatus for improving the cargo carrying capacity of a pickup truck. The truck has a cab portion, a bed portion defined by a bed surface and a pair of side walls and a forward wall adjacent the cab The rack apparatus comprises a side rail arranged on each of the side walls of the bed portion and each of the side rails has a proximal end which is pivotally attached to the side wall at a mid-portion thereof. A crossbar is arranged between the side rails adjacent a distal end thereof. The side rails and the crossbar are pivotable from a stowed out of the way orientation at a forward end of the bed portion to an upright orientation at a rearward end of the bed portion. A stationary rack is arranged at a forward end of the bed portion of the truck to provide a cargo carrying capacity between the stationary rack and the crossbar of the pivotable side rails.

16 Claims, 7 Drawing Sheets

PIVOTABLE RACK APPARATUS FOR A PICKUP TRUCK

This application is a continuation-in-part application of my co-pending U.S. patent application Ser. No. 09/695,482, filed Oct. 24, 2000, and is incorporated herein by reference in its entirety.

BACKGROUND OF THE INVENTION

1. Field of the Invention

The present invention relates to an apparatus for increasing the load carrying capacity of pickup trucks, and particularly to an articulable frame arrangement for increasing that load carrying capacity of a pickup truck.

2. Prior Art

About one in four of every vehicle on the road in the United States today is a pickup truck. Those pickup trucks are often utilized as both a family vehicle and as a utilitarian vehicle for home owners and service personnel. Theirs is often a dual function vehicle.

An attempt at dual function use of a pickup truck is shown by a truck rack adapter called the Rail 'N Rack System™ which permits a conversion of pickup truck bed rails into a rack. It becomes an overhead rack from a pair of bed rails. The bed rails, however, appear to require a supplemental crossbar attachment inasmuch as they are hinged at the rearwardmost point of the truck bed to provide the rear rack assembly. This is somewhat complicated. If the cross bar on the rack were constantly maintained on the side rails, they would take up valuable cargo space when the rack was not in its full upright orientation.

It is an object of the present invention to overcome the disadvantages of the prior art.

It is a further object of the present invention to provide a pickup truck with a simple, efficient, stowable rack arrangement which is not in the way of the cargo bed when the rack is not in its extended orientation but in its "stowed" orientation.

It is a yet further object of the present invention to provide a pickup truck rack arrangement that is simple to set up and which rack arrangement takes up minimum space and is unobtrusive within the cargo bed or on the side rails of the pickup truck.

BRIEF SUMMARY OF THE INVENTION

The present invention comprises an articulable rack arrangement for use about the bed of a pickup truck. A pickup truck is typically a truck having a wheelbase of an automobile and has a "cab" compartment where a driver and a passenger sits. A cargo carrying bed is disposed behind the cab. The bed may be defined by a lowermost bed support surface surrounded by a pair of parallel elongated side walls, and a forward wall immediately adjacent to and parallel to the back wall of the cab. A tailgate is typically hingedly supported from the rearwardmost end of the bed support surface and is pivotable to and from a position adjacent the back end of the sidewalls.

In a first preferred embodiment of the present invention, a stationary side rail may be fixedly supported on an upper edge of each side wall, and extending from a rearward point of the side wall to a mid point thereof on each side wall of the bed of the pickup truck. A generally U-shaped side rail in this embodiment is hingedly attached to the midpoint of each respective side wall, which would coincide with the forward end of each respective stationary side rail.

A forward rack comprised of a generally inverted U-shaped member is arranged fixedly attached to the bed of the pickup truck adjacent the forward wall of the bed. The forward rack has a stationary crossbar which may be preferably just above the roofline of the cab.

The pivotable pair of forward side rails in this first embodiment, are disposed on the upper edge of the respective side walls, each forward side rail being hingedly attached to the midpoint of each sidewall. The U-shaped member resides adjacent the forward end wall of the bed of the truck in an out of the way orientation when the rack assembly is not in its "cargo-carrying" configuration. The forward end of each of the pivotable side rails comprises a first leg which is generally perpendicular to the respective side rails. Each leg is joined to the other leg by a crossbar which resides within the bed of the truck in its folded down configuration.

When it is desired to fully establish the rack arrangement on the bed of the pickup truck, the pivotable side rails sitting on the top edge of each side wall of the bed of the pickup truck, as well as the connecting crossbar are pivoted about their corresponding rear hinge points at the proximal end of each side rail, so that the pivotable side rail is in generally parallel juxtaposition with the stationary side rail on the rear half portion of the side wall of the pickup truck. The first leg portions at the distal end of each pivotable side rail are then in a vertical orientation and the crossbar therebetween, originally residing at an inner forward location just above the support bed now extends supportedly over the tailgate portion of the pickup truck at the rear end of its bed. The crossbar portion of the pivotable side rail arrangement is thus spaced apart and to the rear of the bed of the pickup truck and the crossbar of the forward stationary rack is already supported at and parallel to the forward wall of the bed. Thus those crossbars established the articulable rack system for a pickup truck bed.

In a further embodiment of the present invention the stowable articulable rack arrangement may be supported within the side portions of each respective sidewall so as to not be visable from the outside of the truck. The proximal end of each respective pivotable side rail is hingedly attached to a midpoint of each respective side wall along an inner lip thereof. Each pivotable side rail has as in the first preferred embodiment, at its distal end thereof, a first leg disposed generally perpendicular thereto. Each first leg of each respective side of the pivotable side rail assembly is connected by a crossbar which sits within the forward end of the bed of the pickup truck when it is in its stowed away orientation.

Each pivotable side rail, as in the aforementioned embodiment, may be pivoted about a hinge point on the inner side of each respected side wall, to permit each respective pivotable side rail to be swung 180 degrees rearwardly into a fully articulated rack orientation with the rearward crossbar rack then being parallel to the forward stationary rack and crossbar in its "to be utilized" configuration.

The invention thus comprises a rack apparatus for improving the cargo carrying capacity of a pickup truck. The truck has a cab portion, a bed portion defined by a bed surface and a pair of side walls and a forward wall adjacent the cab. The rack apparatus comprises a side rail arranged on each of the side walls of the bed portion, each of the side rails having a proximal end which is pivotally attached to the side wall at a mid-portion thereof, a crossbar arranged between the side rails adjacent a distal end thereof, the side rails and the crossbar being pivotable from a stowed out of the way orientation at a forward end of the bed portion to an upright orientation at a rearward end of the bed portion. The stationary rack is arranged at a forward end of the bed portion of the truck to provide a cargo carrying capacity between the stationary rack and the crossbar of the pivotable side rails. A hinge is arranged between each of the side rails and the side wall of the truck. The hinge is attached to an upper edge of the side wall of the bed portion. The hinge may also be attached to an inner side edge of the side wall of the bed portion. Each of the side rails has a leg member arranged at a distal end thereof. The legs are each arranged generally perpendicular to their respective side rails. The crossbar is arranged between the legs of the side rails. Each of the side rails may be disposed upon an upper edge of the side walls. Each of the side rails is disposed along an inner edge of the side walls.

The invention also includes a method of improving the cargo carrying capacity of a vehicle comprising the steps of: arranging a generally U-shaped rail assembly onto an upper portion of the truck, the rail assembly comprising a pair of side rails and a crossbar joining the side rails at a first end thereof; attaching a second end of the side rails onto the truck by a hinge arrangement therebetween; pivoting the U-shaped rail assembly from a first stowed out of the way position on the truck, into a second position wherein the crossbar is supported above the truck to permit a cargo to be carried between a mid-portion on the crossbar and a second portion on the truck. The method includes the steps of: arranging a stationary rack at a forward portion of the truck forward of the U-shaped rail assembly, and attaching the second end of the U-shaped rail assembly at a wall on the bed portion, positioning the hinge of the U-shaped rail assembly at a mid-point location of the walls of the bed portion, wherein the stowed away position comprises a location adjacent the bed of the truck, between ther side walls thereof.

BRIEF DESCRIPTION OF THE DRAWINGS

The objects and advantages of the present invention will become more apparent, when viewed in conjunction with the following drawings in which.

DESCRIPTION OF THE PREFERRED EMBODIMENTS

Figure 1:
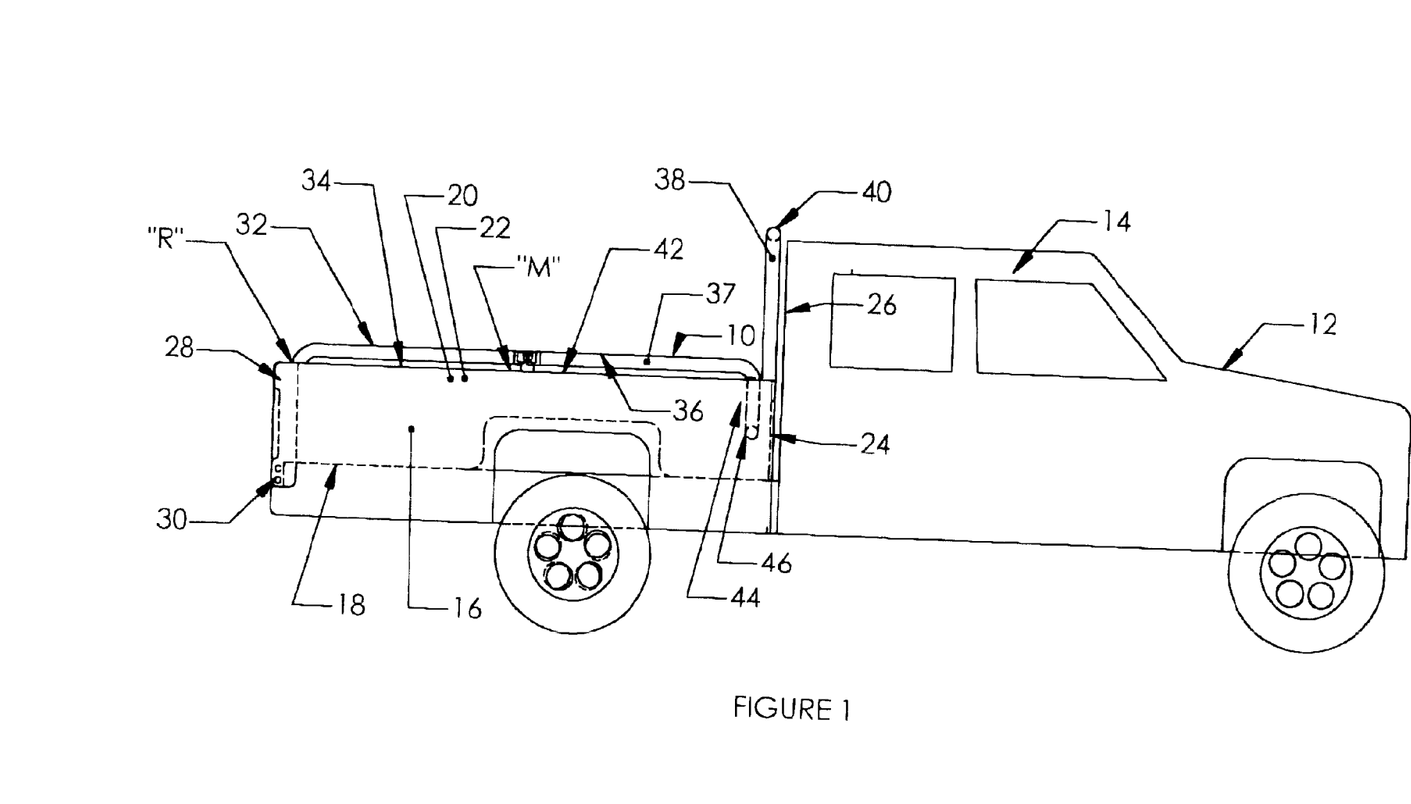
FIG. 1 is a side elevational view of a truck with a stowable side rail assembly constructed according to the principles of the present invention.

Referring now to the drawings in detail and particularly to FIG. 1, there is shown the present invention as an articulable rack arrangement 10 for use about the bed of a pickup truck 12. A pickup truck 12 is typically a truck having a wheelbase of an automobile and has a "cab" compartment 14 where a driver and a passenger sit. A cargo carrying bed 16 is disposed behind the cab 14. The bed 16 may be defined by a lowermost bed support surface 18 surrounded by a pair of parallel elongated side walls 20 and 22, and a forward wall 24 immediately adjacent to and parallel to the back wall 26 of the cab 14. A tailgate 28 is typically swingingly supported by a hinge 30 from the rearwardmost end of the bed support surface 18 and is pivotable to and from a position adjacent the back end of the sidewalls 20 and 22, as may be seen in FIG. 1.

A first preferred embodiment of the present invention comprises a stationary side rail 32 may be fixedly supported on an upper edge 34 of each side wall 20 and 22, (only one side rail 32 actually being shown) and extending from a rearward point "R" of each of the side walls 20 and 22 to a mid point "M" thereof on each side wall 20 and 22 of the bed 18 of the pickup truck 12. A generally U-shaped side rail and crossbar arrangement 36 in this embodiment has a proximal end which is pivotally attached by a hinge 38 to the midpoint "M" of each respective side wall 20 and 22, which would generally coincide with the forward end of each respective stationary side rail 32.

A forward rack 38 comprised of a generally inverted U-shaped member is arranged fixedly attached to the bed 18 of the pickup truck 12 adjacent the forward wall 24 of the bed 18. The forward rack 38 has a stationary crossbar 40 which may be preferably just above the roofline of the cab 14, as may be seen in FIGS. 1, 2 and 3.

Figure 2:
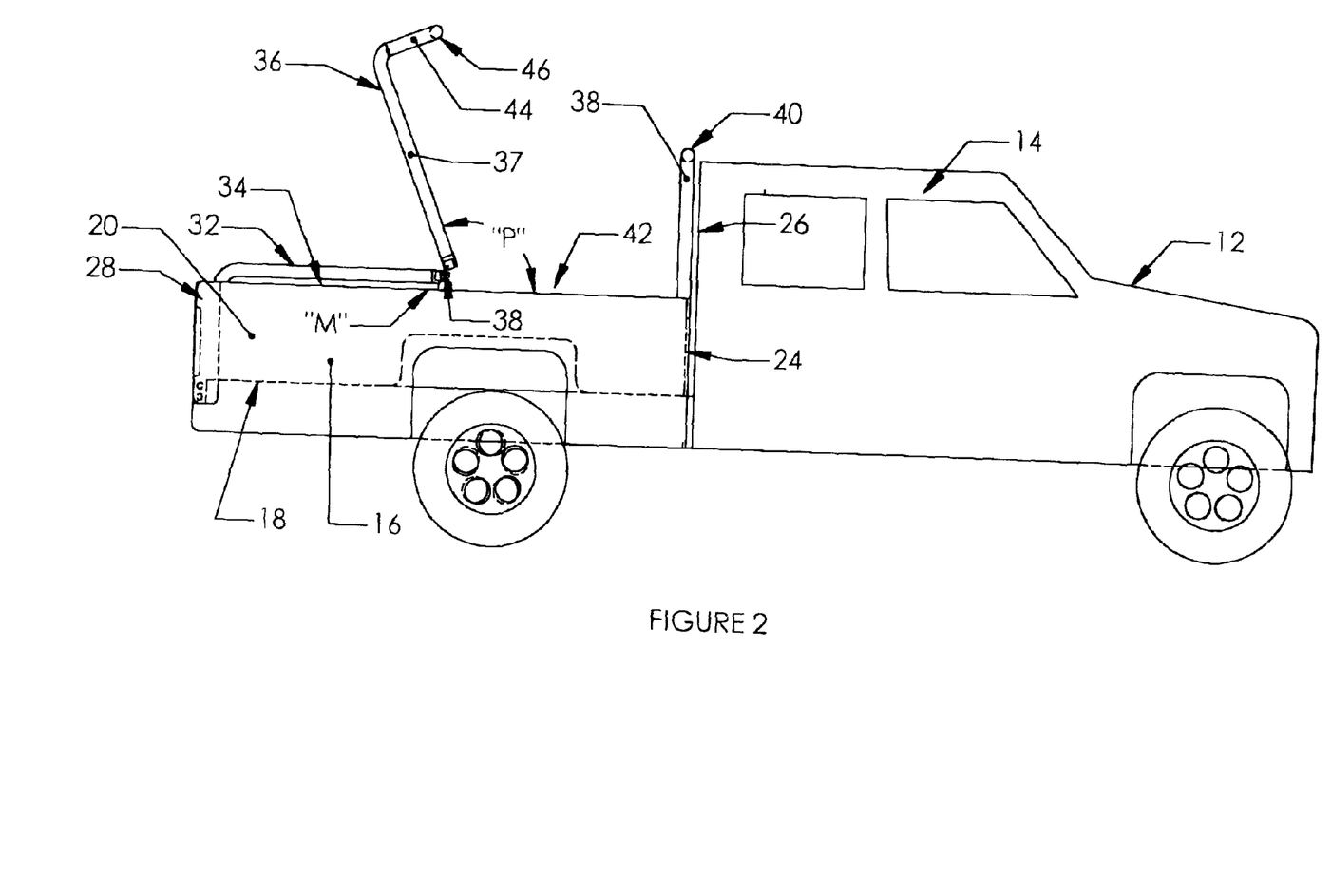
FIG. 2 is a view similar to that of FIG. 1, showing the stowable side rail assembly in a partially pivoted configuration.
Figure 3:
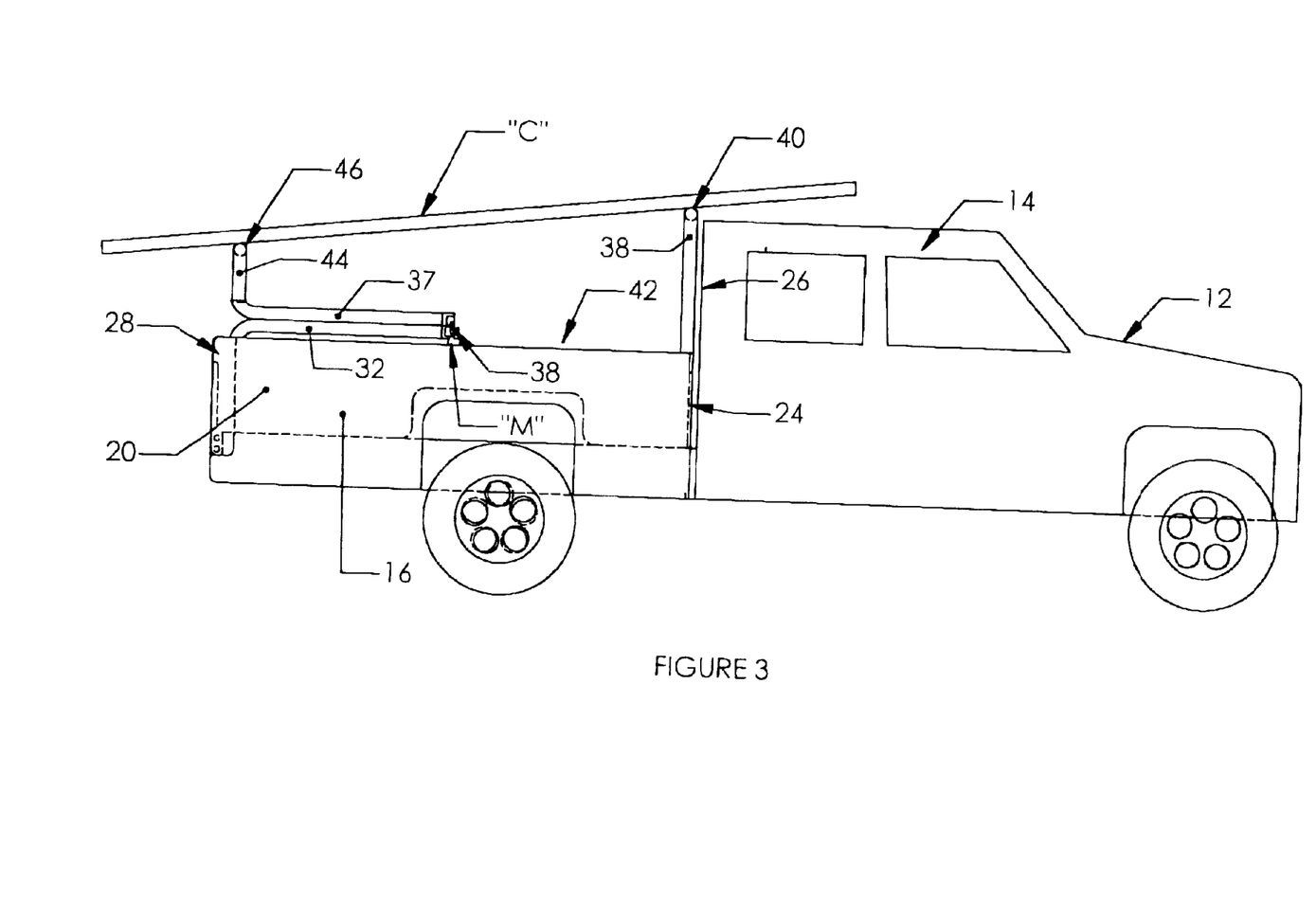
FIG. 3 is a view similar to FIG. 1 showing the stowable rack assembly in its rack rearward cargo-carrying configuration.

The U-shaped side rail and crossbar arrangement 36 in this first embodiment includes a pair of arms 37 (only one side shown for convenience) which are disposed on the upper edge 42 of the respective side walls 20 and 22, each arm 37 of the forward side rail and crossbar arrangement 36 is hingedly attached to the midpoint "M" of each sidewall 20 and 22, as may be seen for example in FIGS. 1 and 2. The U-shaped side rail and crossbar arrangement 36 resides adjacent the forward end wall of the bed 18 of the truck 12 in an out of the way orientation, as may be seen in FIG. 1, when the rack assembly 10 is not in its "cargo-carrying" configuration. The forward end of each arm 37 of the pivotable side rail arrangement 36 comprises a first leg 44 which is generally perpendicular to the respective arm 37 of the side rail and crossbar arrangement 36. Each leg 44 side rail and crossbar arrangement 36 is joined to the other leg of the U-shaped side rail and crossbar arrangement by a crossbar 46 which resides within the bed 18 of the pickup truck 12 in its folded down configuration, as shown in FIG. 1.

Figure 4:
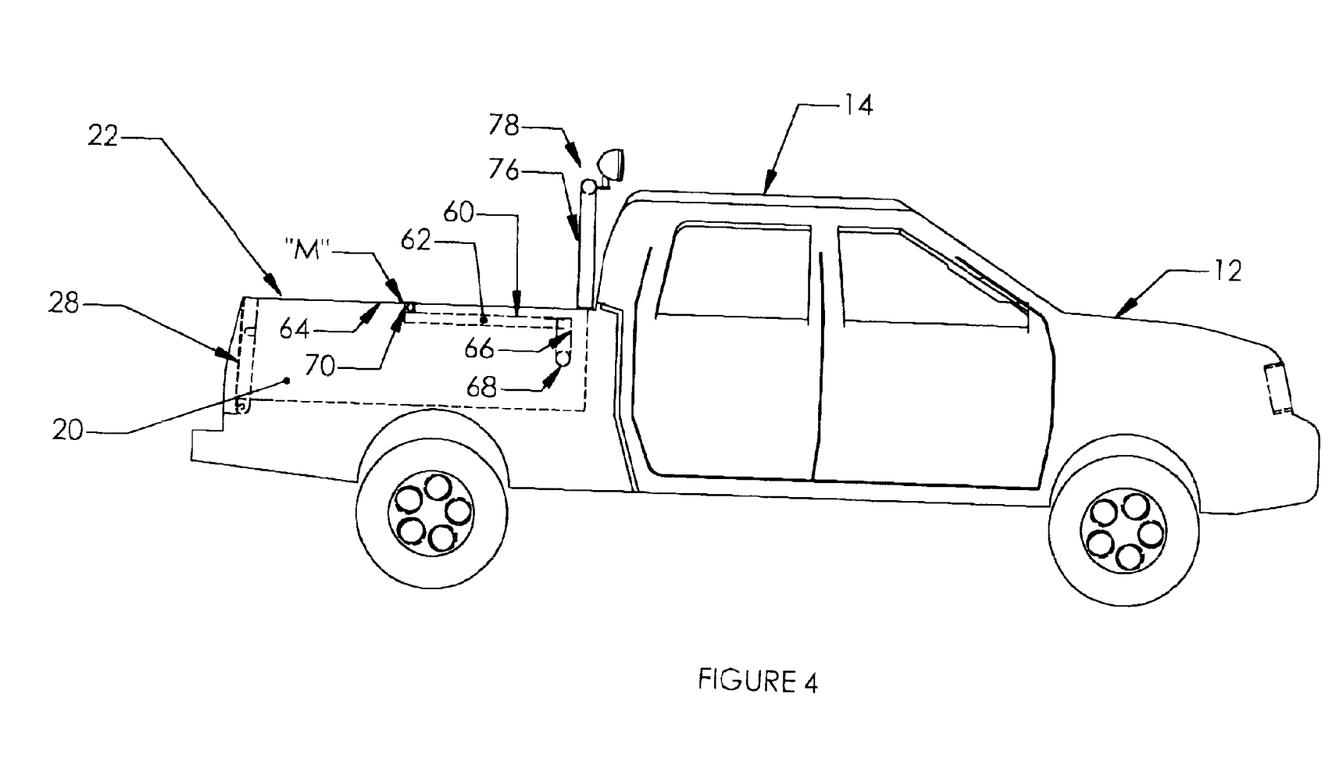
FIG. 4 is a side elevational view similar to FIG. 1 with a further embodiment of the stowable rack assembly in a non-visible stowed configuration.
Figure 5:
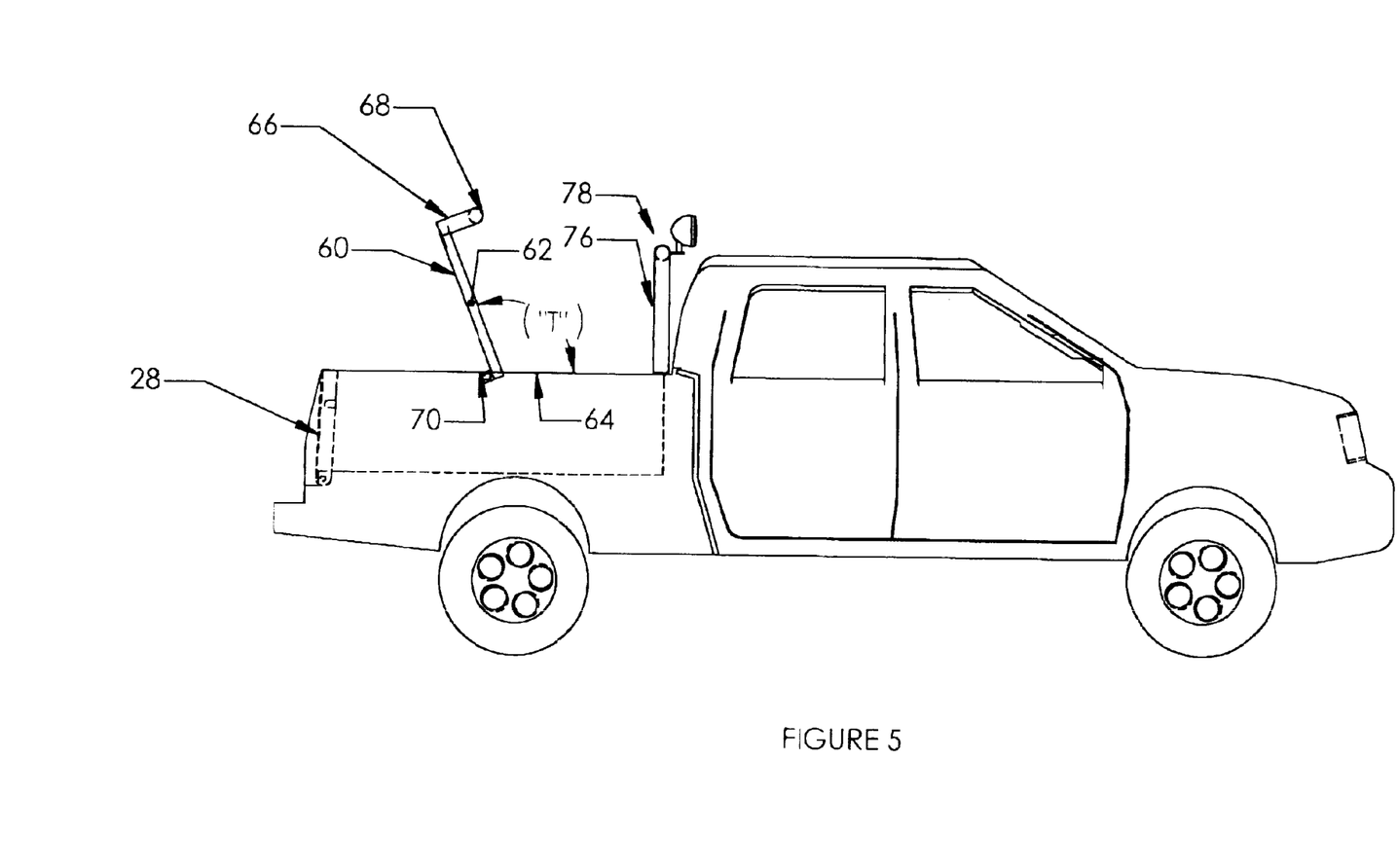
FIG. 5 is a view similar to FIG. 2 with the stowable rack pivoted in a rearwardly tilting direction.
Figure 6:
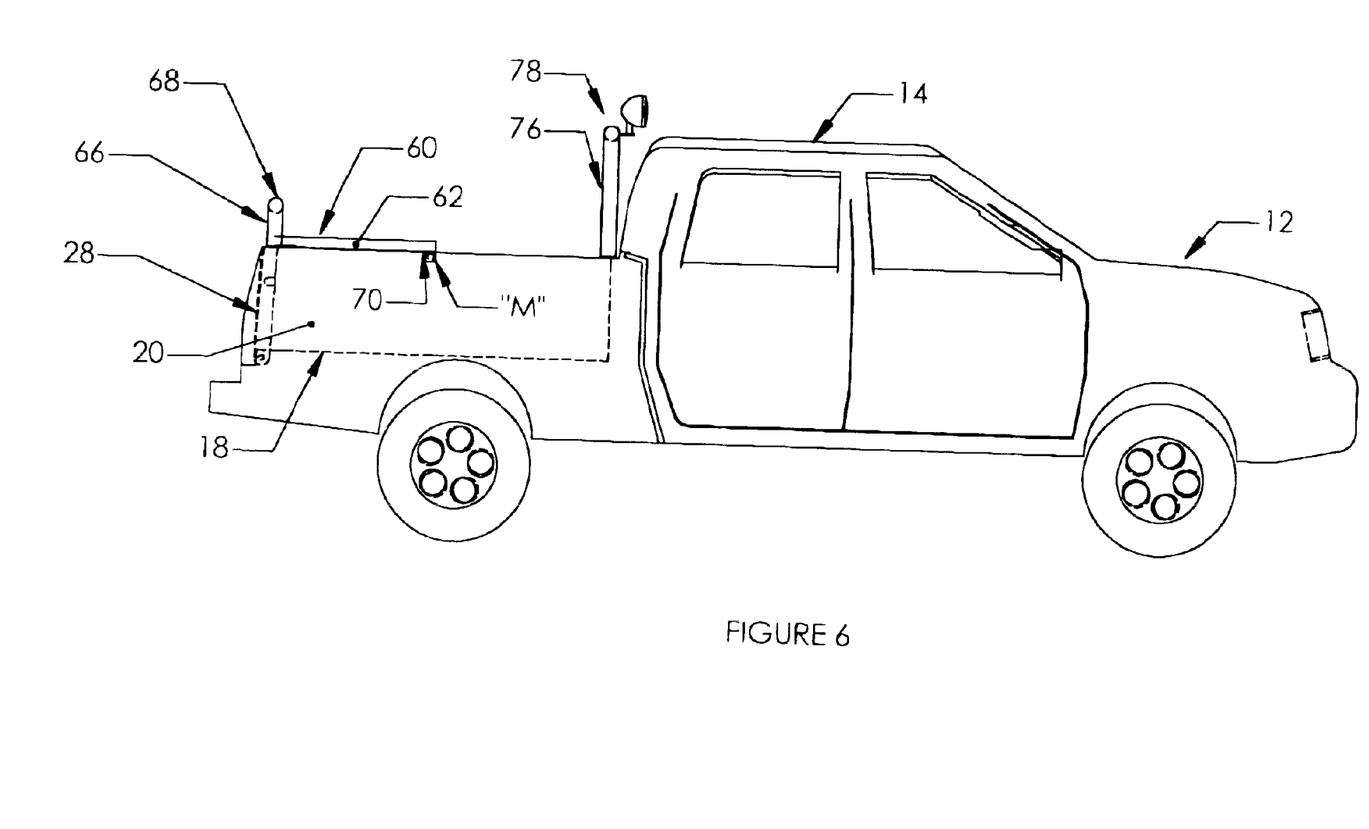
FIG. 6 is a view similar to FIG. 3 showing the hidden stowable rack assembly in its rearward orientation.
Figure 7:
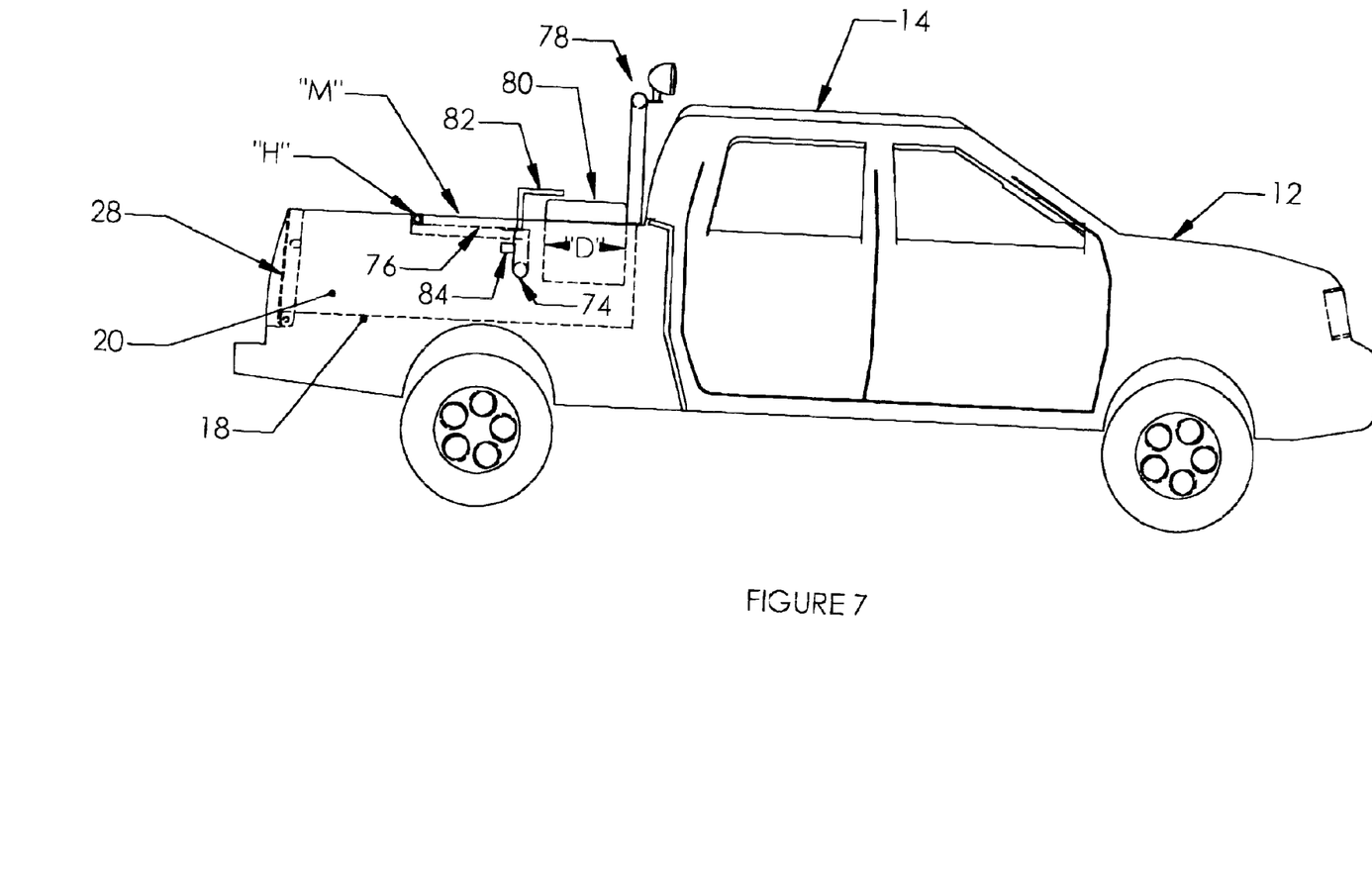
FIG. 7 is a view similar to FIG. 4, showing a further embodiment of the rack assembly utilized with a tool box arranged at the forward end of the bed of the pickup truck.

When it is desired to fully establish the rack arrangement 10 on the bed 18 of the pickup truck 12, the pivotable U-shaped side rail and crossbar arrangement 36 sitting on the top edge 42 of each side wall 20 and 22 of the bed 18 of the pickup truck 12, as well as the connecting crossbar 46 are pivoted about their corresponding rear hinges 38 at the proximal end of each arm 37 of the U-shaped side rail and crossbar arrangement 36 as indicated by the arrow "P" in FIG. 2, so that the pivotable arm(s) 37 of the U-shaped side rail and crossbar arrangement 36 are/is in generally parallel juxtaposition with the stationary side rails 32 on the rear half portion of the side walls 20 and 22 of the pickup truck 12. The first leg portions 44 at the distal end of each pivotable U-shaped side rail and crossbar arrangement 36 are then in a vertical orientation, as may be seen in FIG. 3 and the crossbar 46 therebetween, originally residing at an inner forward location just above the support bed 18 now extends supportedly over the tailgate portion 28 of the pickup truck 12 at the rear end of its bed 18. The crossbar portion 44 of the pivotable U-shaped side rail and crossbar arrangement 36 is thus spaced apart and to the rear of the bed 18 of the pickup truck 12 and the crossbar 40 of the forward stationary rack 38 is already supported at and parallel to the forward wall 24 of the bed 18 to carry cargo "C" thereon, as indicated in phantom in FIG. 3. In a further embodiment of the present invention a stowable articulable rack arrangement 60 may be supported within the side portions of each respective sidewall 20 and 22, so as to not be visable from the outside of the truck 12, as depicted in FIGS. 4, 5 and 6. The proximal end of each respective pivotable side rail 62 (only one side shown) is hingedly attached to a midpoint "M" of each respective side wall 20 and 22 along an inner lip 64 thereof. Each pivotable side rail 62 has as in the first preferred embodiment, at its distal end thereof, a first leg 66 disposed generally perpendicular thereto. Each first leg 66 of each respective side rail 62 of the pivotable side rail assembly 60 is connected by a crossbar 68 which sits within the forward end of the bed 18 of the pickup truck 12 when the side rail assembly 60 is in its stowed away orientation, as depicted in FIG. 4. Each pivotable side rail 62, (only one side being shown) as in the aforementioned embodiment, may be pivoted about a hinge 70 at the mid point "M" on the inner side of each respective side wall 20 and 22, to permit each respective pivotable side rail 62 to be swung 180 degrees rearwardly, through an arc as indicated by arrow "T" in FIG. 5, and into a fully articulated rack orientation with the rearward crossbar rack 60 then being parallel to the forward stationary rack 72 and crossbar 74 in its "to be utilized" configuration, as depicted in FIG. 6. The stationary U-shaped rack 76 with its crossbar 78 and the pivotable side rail assembly 60 with its cross bar 68 are thus available for securement of cargo to be attached thereto, over the bed 18. In a further embodiment as shown in FIG. 7, the crossbar 74 of the rack 76 may, in its "stowed forward" orientation be securably locked against a tool or storage box 80 arranged at the forward end of the bed 18, by an latching lip flange 82 extending from the rack 76 or the crossbar 74. The hinge point "H" in this embodiment may then be displaced rearwardly about half the depth "D" of the storage box from the mid-point "M" location on the sidewall 20 and 22 to permit/accommodate its rearward swing to line up with the tailgate 28. Thus the rack 76 may have a multiple function of securing a box 80 from a locked "stowed forward" position by a lock 84 in each of the sidewalls 20 and 22, and also functioning as a rearward rack when it is pivoted with the crossbar 74 over the tailgate 28.

I claim:

1. A rack apparatus for improving the cargo carrying capacity of a pickup truck, said truck having a cab portion, a bed portion defined by a bed surface and a pair of side walls and a forward wall adjacent said cab, said rack apparatus comprising:

a side rail arranged on each of said side walls of said bed portion, each of said side rails having a proximal end which is pivotally attached to said side wall at a mid-portion thereof;

a crossbar arranged between said side rails adjacent a distal end thereof, said side rails and said crossbar being pivotable from a stowed out of the way orientation at a forward end of said bed portion to an upright orientation at a rearward end of said bed portion; and a stationary rack arranged at a forward end of said bed portion of said truck to provide a cargo carrying capacity between said stationary rack and said crossbar of said pivotable side rails.

2. The rack apparatus as recited in claim 1, including a hinge arranged between each of said side rails and said side wall of said truck.

3. The rack apparatus as recited in claim 1, wherein said hinge is attached to an upper edge of said side wall of said bed portion.

4. The rack apparatus as recited in claim 1, wherein said hinge is attached to an inner side edge of said side wall of said bed portion.

5. The rack apparatus as recited in claim 1, wherein each of said side rails has a leg member arranged at a distal end thereof.

6. The rack apparatus as recited in claim 5, wherein said legs are each arranged generally perpendicular to their respective side rails.

7. The rack apparatus as recited in claim 6, wherein said crossbar is arranged between said legs of said side rails.

8. The rack apparatus as recited in claim 1, wherein each of said side rails is disposed upon an upper edge of said side walls.

9. The rack apparatus as recited in claim 1, wherein each of said side rails is disposed along an inner edge of said side walls.

10. A method of improving cargo carrying capacity of a truck having a bed portion with side walls comprising the steps of:

arranging a generally U-shaped rail assembly onto an upper portion of said truck, said rail assembly comprising a pair of side rails and a crossbar joining said side rails at a first end thereof;

attaching a second end of said side rails onto said truck by a hinge arrangement therebetween;

positioning said hinge arrangement of said U-shaped rail assembly at a longitudinal mid-point location of said walls of said bed portion;

pivoting said U-shaped rail assembly from a first stowed out of the way position on said truck, into a second position wherein said crossbar is supported above said truck to permit a cargo to be carried between a mid-portion on said crossbar and a second portion on said truck.

11. The method as recited in claim 10, including the step of:

arranging a stationary rack at a forward portion of said truck forward of said U-shaped rail assembly.

12. The method as recited in claim 11, including the step of:

attaching said second end of said U-shaped rail assembly at said wall on said bed portion.

13. The method as recited in claim 12, wherein said stowed away position comprises a location adjacent said bed of said truck, between said side walls thereof.

14. The method as recited in claim 12, including the step of:

securing a portion of said first end of said rack against a storage compartment arranged adjacent said first stowed away position of said crossbar.

15. The rack apparat us as recited in claim 1, including a storage compartment arranged at said forward end of said bed, said storage compartment securable to said truck by a member of said rails.

16. The rack apparat us as recited in claim 15, wherein said forward end of at least one of said rails is lockable to at least one of said sidewalls by a lock arranged therebetween.

* * * * *